(12) United States Patent
Jadhav

(10) Patent No.: US 7,556,672 B2
(45) Date of Patent: Jul. 7, 2009

(54) REGENERATIVE PROCESS FOR REMOVAL OF MERCURY AND OTHER HEAVY METALS FROM GASES CONTAINING $H_2$ AND/OR CO

(75) Inventor: Raja A. Jadhav, Naperville, IL (US)

(73) Assignee: Gas Technology Institute, Des Plaines, IL (US)

( * ) Notice: Subject to any disclaimer, the term of this patent is extended or adjusted under 35 U.S.C. 154(b) by 275 days.

(21) Appl. No.: 11/702,237

(22) Filed: Feb. 5, 2007

(65) Prior Publication Data
US 2008/0184884 A1 Aug. 7, 2008

(51) Int. Cl.
*B01D 53/64* (2006.01)
(52) U.S. Cl. .............................. 95/134; 95/148; 96/144; 96/153
(58) Field of Classification Search .................. 96/153, 96/144; 95/134, 148
See application file for complete search history.

(56) References Cited

U.S. PATENT DOCUMENTS

| | | | |
|---|---|---|---|
| 3,812,652 A | | 5/1974 | Carr et al. |
| 4,094,777 A | | 6/1978 | Sugier et al. |
| 4,593,148 A | | 6/1986 | Johnson et al. |
| 4,605,812 A | | 8/1986 | Nowack et al. |
| 4,853,110 A | | 8/1989 | Singhal et al. |
| 4,902,662 A | | 2/1990 | Toulhoat et al. |
| 5,120,515 A | * | 6/1992 | Audeh et al. ................. 423/210 |
| 5,226,934 A | * | 7/1993 | Lefren ........................... 95/224 |
| 5,245,106 A | * | 9/1993 | Cameron et al. ............. 585/823 |
| 5,281,258 A | * | 1/1994 | Markovs ....................... 95/120 |
| 6,007,706 A | | 12/1999 | Carnell et al. |

OTHER PUBLICATIONS

Yan, T.Y., "Mercury Removal from Oil by Reactive Adsorption," *Ind. Eng. Chem. Res.* 1996, 35, 3697-3701.
Kenvin, J.S. et al., "Selective Chemisorption and Oxidation/Reduction Kinetics of Supported Copper Oxide Catalysts Prepared from Copper(II) Acetylacetonate," *Journal of Catalysis*, 130, 447-458 (1991).

* cited by examiner

*Primary Examiner*—Duane Smith
*Assistant Examiner*—Christopher P Jones
(74) *Attorney, Agent, or Firm*—Mark E. Fejer

(57) ABSTRACT

A method for removal of mercury from a gaseous stream containing the mercury, hydrogen and/or CO, and hydrogen sulfide and/or carbonyl sulfide in which a dispersed Cu-containing sorbent is contacted with the gaseous stream at a temperature in the range of about 25° C. to about 300° C. until the sorbent is spent. The spent sorbent is contacted with a desorbing gaseous stream at a temperature equal to or higher than the temperature at which the mercury adsorption is carried out, producing a regenerated sorbent and an exhaust gas comprising released mercury. The released mercury in the exhaust gas is captured using a high-capacity sorbent, such as sulfur-impregnated activated carbon, at a temperature less than about 100° C. The regenerated sorbent may then be used to capture additional mercury from the mercury-containing gaseous stream.

25 Claims, 3 Drawing Sheets

REGENERATIVE PROCESS FOR REMOVAL OF MERCURY AND OTHER HEAVY METALS FROM GASES CONTAINING $H_2$ AND/OR CO

The U.S. Government has a paid-up license in this invention and the right in limited circumstances to require the patent owner to license others on reasonable terms as provided for by the terms of DOE Contract No. DE-FC26-04NT42312 awarded by the U.S. Department of Energy.

BACKGROUND OF THE INVENTION

1. Field of the Invention

This invention relates to a method for removal of mercury from a reducing gas. More particularly, this invention relates to a regenerative method for removal of mercury from a reducing gas containing hydrogen and/or CO, such as a coal-gasifier fuel gas, at temperatures in the range of about 25° C. to about 300° C.

2. Description of Related Art

Because of the health effects of mercury on fish-eating populations, there is a growing concern of mercury emissions from man-made sources, especially from coal-burning power plants. Mercury regulations currently proposed by the U.S Environmental Protection Agency (EPA) for coal-fired power plants also are likely to be applied to the next-generation gasification systems, such as Integrated Gasification Combined Cycle (IGCC) power plants.

The removal of mercury from high-pressure fuels/synthesis gases generated by gasification processes is presently carried out using activated carbon-based processes at low temperature. However, for IGCC systems, such low-temperature processes result in severe energy penalties and reduced efficiencies because the pressurized fuels/synthesis gases produced by the system have to be reheated to the operating temperature (greater than about 300° C.) of the gas turbines employed for electricity generation. Consequently, current focus is on developing sorbents for removal of mercury from fuels/synthesis gases having temperatures in the range of about 150° C. to about 300° C. at pressures in the range of about 300 psi to about 1000 psi.

Development of a sorbent-based process for IGGC systems, however, is a major challenge and currently no proven technologies exist for the removal of trace levels of mercury from high-temperature fuels/synthesis gases. Activated carbon-based sorbents remove mercury primarily by a physisorption mechanism, and they are not effective at higher temperatures. In addition, exposure of impregnated sorbents to gaseous streams at high temperature (greater than about 120° C.) has been shown to release some of the active sulfur component in the gas stream, making the sorbent ineffective.

Another substantial issue is the presence of highly reactive hydrogen in the fuels/synthesis gases which can alter the chemical characteristics of an otherwise active sorbent, making it ineffective for mercury removal. In addition, the reaction or interaction of mercury with the active component in the sorbent may not be favorable in the presence of hydrogen. For example, the stability of HgS and HgSe mercury species in reducing gases has been shown to be very low at temperatures greater than about 300° C.

Thus, there is a need for a process that can remove mercury from solid fuel gasifier fuels/synthesis gases at high temperature. There is also a substantial interest in reducing emissions of other heavy elements, such as arsenic, selenium, and cadmium along with the mercury due to the environmental impact of these emissions. A process which can remove these heavy elements in a regenerative manner will have the added benefit of using the expensive sorbent over many cycles.

CuS-based sorbents have been widely used in the removal of mercury from oil and natural gas. CuS reacts with mercury in the gas stream and forms a stable HgS product in accordance with the following equation:

$$2CuS + Hg(g) \rightarrow Cu_2S + HgS \qquad (1)$$

U.S. Pat. No. 4,094,777 discloses a process for capturing mercury from a gas or a liquid using a supported CuS sorbent. The solid dispersant or support is selected from the group formed by silica, alumina, and others and the amount of copper in the sorbent is in the range 2 to 65 wt %.

Studies have focused on the development of sorbents based on metals, their oxides, sulfides, and selenides. Studies of the mercury removal potential of activated carbon and iron oxide from fuel gases over the temperature range of about 80° C. to about 175° C. indicate that mercury removal activity is accelerated by the presence of $H_2S$. The studies suggest that active sulfur sites are generated on the sorbent surface in the presence of $H_2S$, which in turn interact with gas-phase mercury.

U.S. Pat. No. 4,902,662 discloses a method for preparing supported CuS sorbents. The method comprises incorporating a copper compound with a solid inorganic carrier, optionally roasting this product in air to generate copper oxide, incorporating in the oxide at least one organic polysulfide, and thermally treating the resultant mass to produce copper sulfide.

U.S. Pat. No. 6,007,706 discloses a process for removing sulfur together with other contaminants such as mercury and arsenic from fluids. This process utilizes a bed containing a copper compound that is converted into copper sulfide by the sulfur component in the fluid, which copper sulfide subsequently removes the mercury and arsenic.

U.S. Pat. No. 4,593,148 discloses a method for capturing arsine and hydrogen sulfide by making use of a bed of copper oxide and zinc oxide. U.S. Pat. No. 4,605,812 discloses that arsines can be removed from inert gases by contacting the streams with copper (II) chromite catalyst. U.S. Pat. No. 3,812,652 discloses that copper oxide used to remove arsenic from hydrocarbon streams can be regenerated by contacting the copper oxide with a stream of molecular oxygen in the range 150-700° F.

U.S. Pat. No. 4,853,110 discloses a method for removing arsenic and/or selenium from shale oil by reaction with a metal oxide and/or metal sulfide, where the metal is selected from a group consisting of molybdenum, nickel, and cobalt.

Although the use of supported CuS sorbents for capture of mercury and/or arsenic from certain fluid streams is known, the removal of these impurities from a gas stream containing high concentrations of $H_2$ and/or CO at temperatures higher than 150° C. is not known. Under such conditions, CuS-based sorbents are not effective. Thermodynamically, CuS is reduced in the presence of $H_2$ and its reduced form, $Cu_2S$, is ineffective for mercury capture. In addition, sulfur from the sorbent is released in the form of $H_2S$ in accordance with the following reaction:

$$2CuS + H_2(g) \rightarrow Cu_2S + H_2S(g) \qquad (2)$$

SUMMARY OF THE INVENTION

Accordingly, it is one object of this invention to provide a method for removing mercury from a gaseous stream comprising a reducing gas, such as hydrogen and/or CO, over the temperature range of about 25° C. to about 300° C.

It is another object of this invention to provide a method for removal of mercury from a gaseous stream comprising a reducing gas utilizing a supported Cu-based sorbent.

It is yet another object of this invention to provide a method for removal of mercury from a gaseous stream comprising a reducing gas utilizing a Cu-based sorbent comprising steps for regeneration of the sorbent.

It has been discovered that when a gaseous stream comprising mercury also contains sulfur components such as $H_2S$ and COS, active sulfur is retained with copper in a supported Cu sorbent and, thus, the supported Cu sorbent can be used to remove mercury and other trace elements from a reducing gaseous stream.

It also has been discovered that when the spent sorbent is exposed to a mercury-free and $H_2S$/COS-free gas stream that contains $H_2$ and/or CO, mercury is readily released from the sorbent at the same temperature as the capture process. To increase the rate of mercury release, it may be advantageous to increase the regeneration temperature by 5-100° C.

It has been discovered that a dispersed CuO or Cu sorbent captures mercury from gases containing $H_2$ with high capacity, provided $H_2S$ is also present in the gas stream. It is theorized that when CuO or Cu is in a dispersed form on a high surface area support, the conditions are not suitable to form $Cu_2S$ because formation of $Cu_2S$ requires two Cu atoms separated by an interatomic distance of approx. 3.61 Å, as in a "regular" (or crystalline/unsupported) CuO sorbent. When Cu atoms are monoatomically dispersed with distance between two Cu atoms greater than approx. 3.61 Å, Cu reacts with $H_2$ and $H_2S$ to form CuS instead of $Cu_2S$. The reactive CuS form is believed to be responsible for capture of Hg by a chemisorption mechanism rather than the chemical reaction given by reaction (1).

It has also been discovered that the mercury thus captured by the supported Cu sorbent is released easily when the spent sorbent is exposed at the same temperature (or slightly higher temperature) to a mercury-free gas stream containing a reducing gas, such as $H_2$ and/or CO. Although not experimentally verified, it appears that during regeneration, $H_2$ and/or CO breaks the Cu—S bond, thereby releasing Hg along with S as $H_2S$.

Accordingly, the objects of this invention are addressed by a method for removal of mercury from a gaseous stream comprising the mercury, hydrogen and/or CO, and hydrogen sulfide ($H_2S$) and/or carbonyl sulfide (COS) in which a dispersed Cu-containing sorbent is contacted with the gaseous stream at a temperature in the range of about 25° C. to about 300° C. until the mercury concentration in the gaseous stream after contacting the sorbent exceeds a predetermined breakthrough level, resulting in the formation of a spent sorbent comprising sorbed mercury. The spent sorbent is then contacted with a desorbing gaseous stream, preferably a substantially mercury- and $H_2S$/COS-free gaseous stream comprising hydrogen and/or CO, at a temperature equal to or slightly higher than the temperature at which the mercury adsorption is carried out, producing a regenerated sorbent and an exhaust gas comprising released mercury. The flow rate of the desorbing gaseous stream is maintained as low as possible, in the range of about 0.5-10 vol % of the fuel gas stream, to increase the concentration of mercury in the exhaust gas. The released mercury in the exhaust gas, which contains higher concentrations of mercury in a lower volume of gas, is then captured using a sorbent, such as sulfur-impregnated activated carbon or copper sulfide, at a temperature less than about 100° C. The regenerated sorbent may then be used to capture additional mercury from the mercury-containing gaseous stream. This cycle can be repeated as many times as necessary to achieve mercury capture from the gaseous stream. The process may be carried out at pressures in the range of about 1 bar to about 200 bar. Other heavy metals in the gaseous stream, such as arsenic, cadmium, and selenium, also may be captured and released along with the mercury.

Various methods for preparing dispersed CuO on a support are known in the art. These include wet impregnation, incipient wetness, and SILAR (Successive Ionic Layer Adsorption and Reaction). The source of copper in these methods may be any soluble copper compound, such as copper acetate, acetylacetonate, nitrate, sulfate, hydroxide, and chloride. The support used as a dispersant may be selected from a group consisting of alumina, silica, fumed silica, aluminates, silicates, aluminosilicates, zeolites, clays, and activated carbon.

Theoretically, the amount of Cu on the support corresponding to monolayer dispersion depends on the surface area of the support. Based on a simple close-packed monolayer model, it has been calculated that 0.19 g of CuO can be loaded per 100 $m^2$ of the support surface area. However, the actual loading of CuO corresponding to its monolayer dispersion depends on the preparation method, solubility of the copper compound and the pore volume of the support, and, thus, may be different from the theoretical value.

Although this discussion refers to dispersed Cu or CuO sorbents, other dispersed sorbents in which Cu or CuO is in a sub-monolayer, monolayer, multilayer or segregated crystallite form are also deemed to be within the scope of this invention. In addition, Cu or CuO may be in a nanocrystalline form. Preferably, the loading of Cu on the support is in the range of about 5-40 wt % of the supported Cu sorbent. Supported Cu sorbent, prepared by any method, is deemed to be within the scope of this invention where $H_2S$ in the gas phase provides a positive effect on the mercury sorption capacity of the sorbent and the captured mercury is released by exposing it to a mercury- and $H_2S$/COS -free gaseous stream containing $H_2$.

The fundamental discovery of this invention is that in the presence of hydrogen sulfide and/or carbonyl sulfide, a supported or dispersed Cu sorbent removes mercury with high efficiency from reducing fuel gases. The captured mercury can be released by exposing the spent sorbent to a mercury-free gas stream containing a reducing gas, such as hydrogen and/or CO. This adsorption/desorption process can be repeated multiple times to remove mercury from the reducing gas. Hydrogen sulfide, carbonyl sulfide and other trace elements present in coal-gasifier fuel gas, such as arsenic, cadmium, and selenium, may also be removed along with the mercury.

BRIEF DESCRIPTION OF THE DRAWINGS

This and other objects and features of this invention will be better understood from the following detailed description taken in conjunction with the drawings wherein.

DETAILED DESCRIPTION OF THE PRESENTLY PREFERRED EMBODIMENTS

The invention disclosed herein involves the use of a supported Cu sorbent to capture mercury from gaseous streams containing, in addition to the mercury, one or more reducing gases, such as $H_2$ and/or CO, and $H_2S$ and/or COS. The concentration of total sulfur components in the gaseous stream is at least about 50 ppmv. Other components of the gaseous stream may include $H_2O$, $CH_4$, higher hydrocarbons and trace amounts of arsenic and selenium. In the presence of these gaseous components, the supported Cu sorbent, in which the Cu is in a dispersed form, forms reactive CuS rather than the thermodynamically favored inactive form $Cu_2S$. Mercury is removed by the reactive CuS component. Other gaseous stream components which may also be removed by the sorbent include $H_2S$, COS, arsenic, and selenium. When the spent sorbent is exposed to a gaseous stream containing a reducing gas, such as $H_2$ and/or CO, the sorbed mercury is released and the sorbent is returned to its original active form. Sulfur in the form of $H_2S$ and/or COS may also be released from the CuS sorbent along with the mercury during the sorbent regeneration process. The released $H_2S$ and/or COS may be converted to elemental sulfur by a Claus process.

Figure 1:
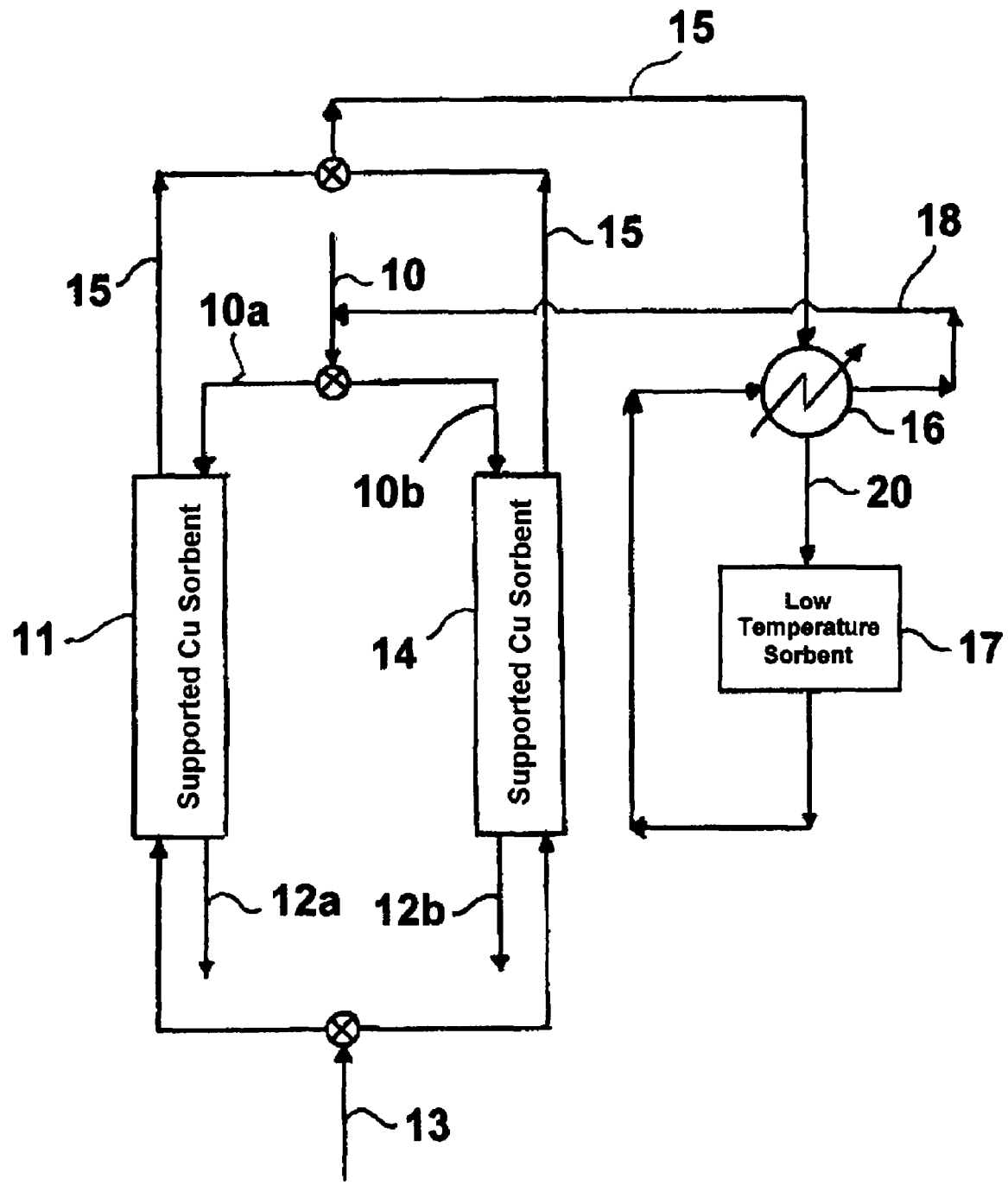
FIG. 1 is a flow diagram of a method to remove mercury from a gas stream at high temperature in accordance with one embodiment of this invention.

FIG. 1 is a schematic diagram showing the basic steps of the method in accordance with one embodiment of this invention. As shown therein, a gaseous stream 10 containing Hg, $H_2$, CO, $CO_2$, $H_2O$, $CH_4$, higher hydrocarbons, $H_2S$, and COS and other heavy metals is introduced through line 10a into a first adsorber 11 containing a supported Cu sorbent. The contact between the sorbent and the gaseous stream is allowed to continue until the mercury and other heavy metals concentration in the exit stream 12a from the adsorber 11 exceeds a predetermined breakthrough level. At this point in the process, the gaseous stream 10 is diverted through line 10b into a second adsorber 14 containing a fresh bed of sorbent to generate stream 12b. The temperature of the supported Cu sorbent in adsorbers 11 and 14 during the adsorption process is in the range about 100-300° C.; pressure is in the range of about 1-200 bar. After diverting the gaseous stream into second adsorber 14, the spent sorbent bed in first adsorber 11 is regenerated with a mercury-free or mercury-lean regenerating stream 13 containing $H_2$ and/or CO to release mercury (and other heavy metals) in a regenerated gas stream 15. The temperature of the adsorber 11 during the regeneration step is increased by 5-100° C. to enable rapid release of the heavy metals. The flow rate of the regenerating stream 13 is maintained much lower than that during adsorption to increase the concentration of mercury and other heavy metals in the regenerated gas stream 15. The regenerating stream 13 may be a clean syngas or fuel gas stream with low amounts of $H_2S$, COS, and heavy metals. The regenerated sorbent is then ready for Hg capture. When the mercury level in exit stream 12b from second adsorber 14 exceeds a predetermined level, flow of gaseous stream 10 is diverted back to first adsorber 11 while regenerating stream 13 is diverted to second adsorber 14 for regeneration of the spent sorbent therein. The regenerated gas stream 15 containing Hg, other heavy metals and possibly sulfur components ($H_2S$ and COS) is cooled in heat exchanger 16 to less than 100° C. and sent by way of line 20 to contactor 17 containing a low temperature sorbent bed for removal of the Hg and other heavy metals, such as sulfur-impregnated activated carbon or copper sulfide. Exit gas stream 18 from contactor 17 is heated in the heat exchanger 16 and mixed with gaseous stream 10 and the combined stream is sent to the active adsorber. The high temperature mercury adsorber may be any suitable reactor used for gas-solid contact, such as a fixed bed, fluidized bed, moving bed, or entrained bed.

The method of this invention has several advantages. Firstly, for applications in which gaseous stream 10 is a fuel gas, the fuel gas stream remains at high temperature and pressure, thereby increasing the thermodynamic efficiency of the IGCC process compared to a process in which the fuel gas stream is cooled to a lower temperature to capture Hg. Secondly, mercury is ultimately captured by a high capacity sorbent at low temperature. Since the concentration of Hg in regenerated stream 15 is increased many-fold and the volume of regenerated stream 15 is decreased many-fold over that of the original fuel gas stream 10, a smaller amount of mercury sorbent can be used in contactor 17. In addition, since the contactor exit stream 18 is sent back to the active absorber, heavy metals which happen to pass through the low-temperature sorbent may still be recovered.

EXAMPLE 1

A sorbent containing 20 wt. % Cu on alumina was prepared using an incipient wetness method, which is well known to those skilled in the art. Copper nitrate was used as the source of copper. The support used was high surface area gamma-alumina having a surface area of about 255 $m^2/g$, a bimodal pore size distribution, a median pore size of about 70 microns and 5000 Å, and a total pore volume of about 1.14 cc/g. The support, in the form of ⅛-inch pellets was obtained from Alfa-Aesar. The prepared sorbent was dried at 100° C. for six (6) hours and calcined in air at 400° C. for an additional six (6) hours. The pellets were crushed and sieved to obtain particles in the range of about 250 microns to about 400 microns.

Figure 2:
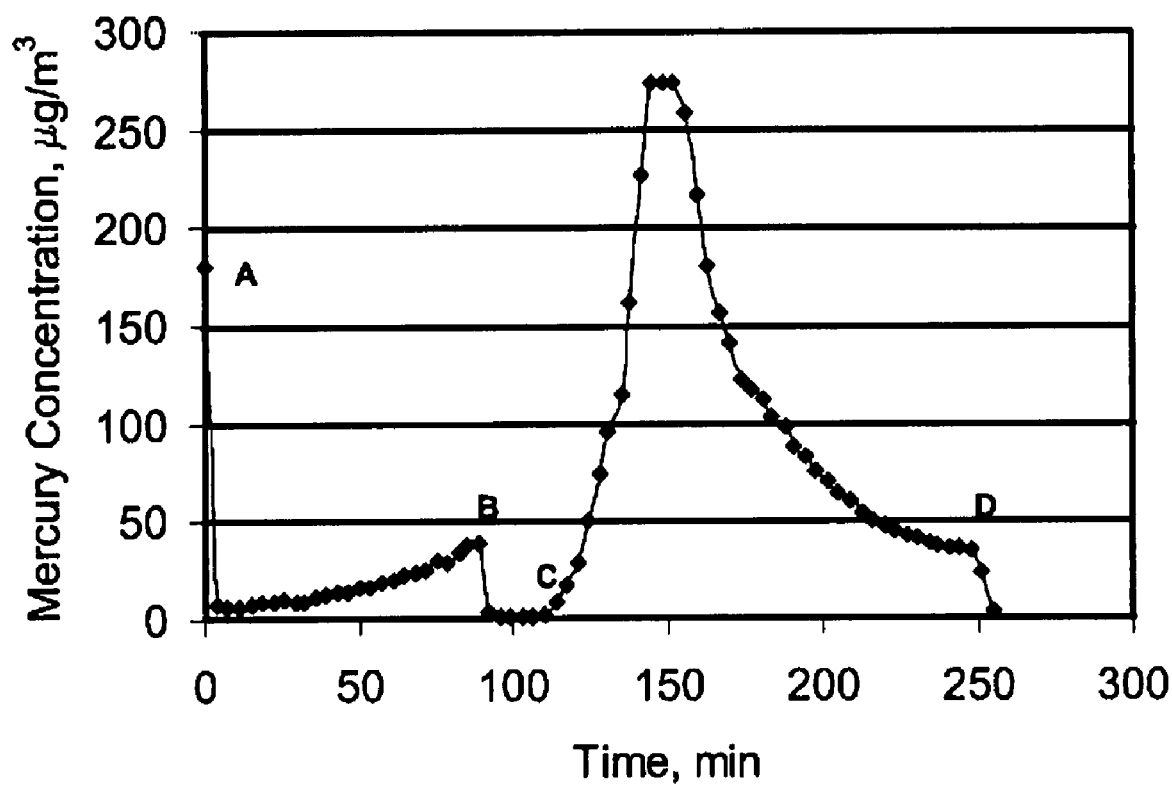
FIG. 2 is a diagram showing the adsorption/desorption behavior of 20 wt % Cu/alumina at 150° C.

About 0.5 g of the sorbent was loaded into a quartz reactor enclosed in an electric furnace maintained at a temperature of about 150° C. Initially, the sorbent was pre-reduced in the presence of 2 vol % $H_2$ in a $N_2$ stream to obtain the reduced form of the sorbent. Next, the reduced sorbent was sulfided for one (1) hour in a fuel gas stream containing 0.4% by volume $H_2S$, 0.4% by volume COS, 38% by volume $H_2$, 30% by volume CO, 8.0% by volume $CO_2$, and 20% by volume $H_2O$ with the balance being $N_2$. The flow rate of the gas was maintained at about 2 slpm (standard liters per minute). After sulfidation, about 190 micro-gm/$m^3$ of mercury was added to the fuel gas stream, Point A in FIG. 2, and the outlet mercury concentration was monitored with a mercury analyzer. FIG. 2 shows the breakthrough curve of mercury capture by the sorbent. After about 80 minutes, at Point B in FIG. 2, mercury flow to the sorbent was stopped and the sorbent was exposed to 2 slpm of $N_2$ at 150° C. It can be seen that the amount of mercury released from the sorbent in $N_2$ is very low. At Point C of FIG. 2, the desorbing gas was changed to 2 slpm of 20% by volume $H_2$, 30% by volume CO, 8% by volume $CO_2$, with the balance being $N_2$. As can be seen, after the introduction of $H_2$ and CO, the amount of mercury released from the sorbent was greatly increased. At Point D in FIG. 2, about 0.4% by volume $H_2S$ and 0.04% by volume COS was added to the gas stream, maintaining the total gas flow at 2 slpm. After the introduction of the $H_2S$, the release of mercury from the sorbent was suppressed, which suggests that the $H_2S$ and/or COS has a positive effect on the capture of mercury by the supported Cu sorbent.

EXAMPLE 2

Figure 3:
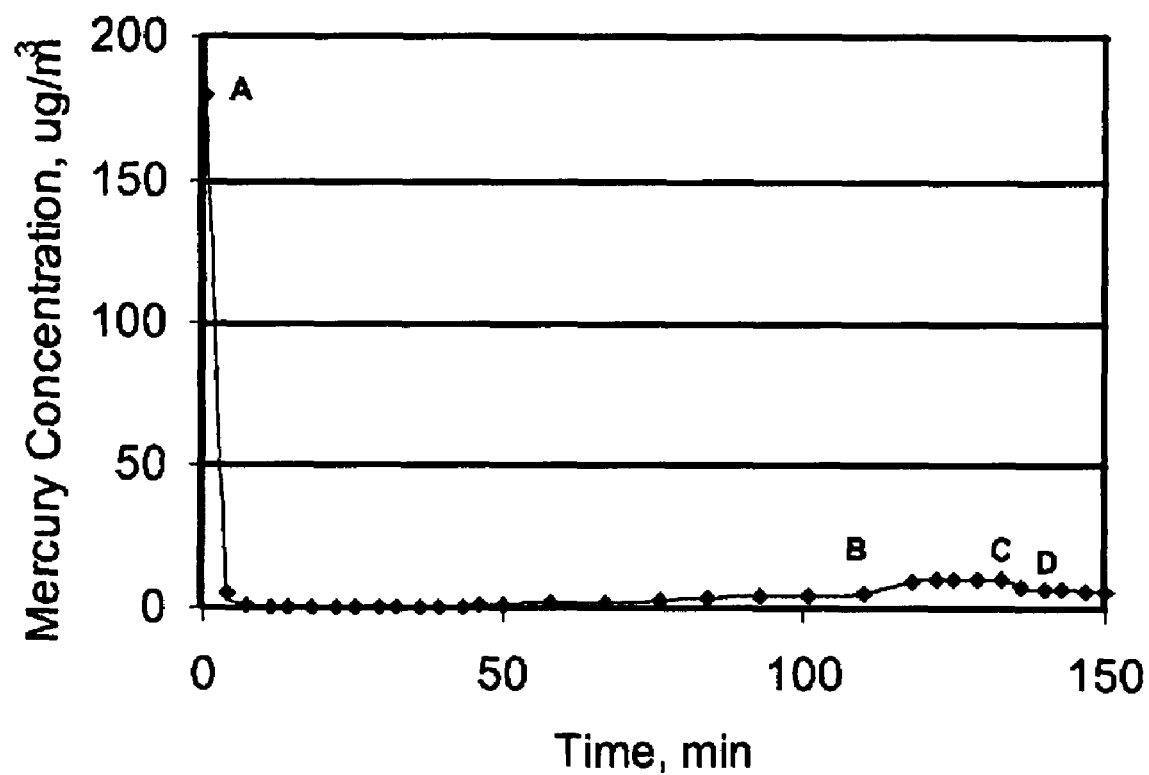
FIG. 3 is a diagram showing a mercury breakthrough plot for Katalco 83-3S at 200° C.

In order to show that the process of this invention is particularly suitable for supported/dispersed sorbent, an experiment was performed with a sorbent in which Cu was not deposited on a support. In this example, a pre-sulfided Cu-based sorbent (Katalco 83-3S) was obtained from Johnson Matthey Catalysts having an elemental composition of 8.56% by weight Al, 32.4% by weight Cu, 20% by weight Zn, and 14.3% by weight S. The sorbent had a surface area of 71 $m^2/g$ and a porosity of 0.145 ml/g. About 1.5 g of the sorbent in the size range of about 180 to 250 microns was exposed to a gaseous stream containing 180 micro-g/m$^3$ of mercury and 25% by volume H$_2$, with the balance being N$_2$, at 200° C. A breakthrough plot monitoring the outlet mercury concentration is shown in FIG. 3. Point A in FIG. 3 denotes the start of the exposure period. After about 110 minutes from the start of the exposure period, at Point B in FIG. 3, about 1250 ppm of H$_2$S was added to the gaseous stream. FIG. 3 does not show any positive effect from the addition of H$_2$S on the capture of mercury by the sorbent. At Point C in FIG. 3, after about 133 minutes from the start of the exposure period, the sorbent was exposed to 2 slpm of N$_2$ at 200° C. FIG. 3 shows that a very small amount of mercury is released from the sorbent upon exposure to the N$_2$. At Point D in FIG. 3, hydrogen was added to the gaseous stream to make the composition 25% by volume H$_2$/75% by volume N$_2$. As can be seen, there is no indication in FIG. 3 that hydrogen has any effect on the release of mercury from the sorbent.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

What is claimed is:

1. A method for removal of mercury from a gaseous stream comprising said mercury, at least one of molecular hydrogen and carbon monoxide, and at least one of hydrogen sulfide (H$_2$S) and carbonyl sulfide (COS) comprising the steps of:
    contacting a dispersed Cu-containing sorbent with said gaseous stream at a temperature in a range of about 25° C. to about 300° C. until mercury concentration in said gaseous stream subsequent to contacting said sorbent exceeds a predetermined breakthrough level, forming a spent sorbent comprising sorbed mercury;
    contacting said spent sorbent with a substantially mercury- and H$_2$S/COS-free gaseous stream comprising a reducing gas, producing released mercury and a regenerated sorbent; and
    capturing said released mercury using a high capacity sorbent at a temperature less than about 100° C.

2. A method in accordance with claim 1, wherein said reducing gas is selected from the group consisting of H$_2$, CO, and mixtures thereof.

3. A method in accordance with claim 1, wherein said high capacity sorbent comprises sulfur.

4. A method in accordance with claim 3, wherein said high capacity sorbent is selected from the group consisting of sulfur-impregnated activated carbon, copper sulfide, and mixtures thereof.

5. A method in accordance with claim 1, wherein said gaseous stream comprises a fuel gas produced in a gasification process.

6. A method in accordance with claim 1, wherein said gaseous stream is at a pressure in a range of about 1 bar to about 100 bar.

7. A method in accordance with claim 1, wherein said dispersed Cu-containing sorbent is selected from the group consisting of CuO, Cu, CuS and mixtures thereof.

8. A method in accordance with claim 1, wherein said dispersed Cu-containing sorbent is supported on a support material selected from the group consisting of high surface area alumina, silica, fumed silica, aluminates, silicates, aluminosilicates, zeolites, clays, activated carbon, and mixtures thereof.

9. A method in accordance with claim 1, wherein said spent sorbent is regenerated at a temperature in a range of about 150° C. to about 300° C.

10. A method in accordance with claim 1, wherein said at least one of said hydrogen sulfide and said carbonyl sulfide is captured with said mercury by at least one of said dispersed Cu-containing sorbent and said high capacity sorbent.

11. A method in accordance with claim 10, wherein said gaseous stream further comprises at least one of arsenic, cadmium, and selenium which is captured with said mercury by at least one of said dispersed Cu-containing sorbent and said high capacity sorbent.

12. A method in accordance with claim 11, wherein said at least one of hydrogen sulfide, carbonyl sulfide, arsenic, cadmium, and selenium is released from said spent sorbent together with said mercury.

13. A method in accordance with claim 10, wherein said at least one of said hydrogen sulfide and said carbonyl sulfide is further processed to produce elemental sulfur after release by said dispersed Cu-containing sorbent.

14. A method in accordance with claim 1, wherein said released mercury is captured at a temperature less than about 25° C.

15. A method in accordance with claim 1, wherein said dispersed Cu-containing sorbent comprises Cu atoms in a monolayer, sub-monolayer, multilayer, or nanocrystallite form.

16. A method in accordance with claim 8, wherein said Cu comprises in a range of about 5 wt. % to about 40 wt. % of said supported sorbent.

17. A method for removal of mercury from a gaseous stream comprising said mercury, at least one of molecular hydrogen and carbon monoxide and at least one of hydrogen sulfide and carbonyl sulfide comprising the steps of:
    adsorbing said mercury using a dispersed Cu-containing sorbent at a temperature in a range of about 100° C. to about 300° C., forming a spent dispersed Cu-containing sorbent;
    regenerating said spent dispersed Cu-containing sorbent using a gaseous regenerating stream comprising at least one reducing gas, producing released mercury and a regenerated dispersed Cu-containing sorbent; and
    capturing said released mercury with a high capacity sorbent at a temperature less than about 100° C.

18. A method in accordance with claim 17, wherein said high capacity sorbent comprises sulfur.

19. A method in accordance with claim 18, wherein said high capacity sorbent is selected from the group consisting of sulfur-impregnated activated carbon, copper sulfide, and mixtures thereof.

20. A method in accordance with claim 17, wherein said gaseous stream is a fuel gas produced by a gasification process.

21. A method in accordance with claim 17, wherein said gaseous stream is at a pressure in a range of about 1 bar to about 100 bar.

22. A method in accordance with claim 17, wherein said dispersed Cu-containing sorbent comprises at least one of CuO, Cu, and CuS.

23. A method in accordance with claim 17, wherein said dispersed Cu-containing sorbent is supported on a support material selected from the group consisting of high surface area alumina, silica, fumed silica, aluminates, silicates, aluminosilicates, zeolites, clays, activated carbon, and mixtures thereof.

24. A method in accordance with claim 17, wherein said spent dispersed Cu-containing sorbent is regenerated at a temperature in a range of about 150° C. to about 300° C.

25. A method in accordance with claim 17, wherein said reducing gas is selected from the group consisting of $H_2$, CO, and mixtures thereof.

* * * * *